June 16, 1959     V. P. HUFF     2,891,140

VEHICLE LIGHT

Filed June 8, 1956

INVENTOR.
VIOLET P. HUFF

BY

McMorrow, Berman + Davidson
ATTORNEYS

# 2,891,140

VEHICLE LIGHT

Violet Putnam Huff, Mound City, Kans., assignor of one-third to Lloyd G. Huff and one-third to Mildred Jaeger Huff, both of Mound City, Kans.

Application June 8, 1956, Serial No. 590,222

4 Claims. (Cl. 240—7.1)

This invention relates to a distress signal device incorporated in an automobile body for apprising persons located outside thereof of a distress condition of an occupant of the automobile.

Occupants of automobiles are at times subject to kidnaping, robbery, or illness, and at times have no adequate means available for apprising bypassers of their distress condition. Also, truck drivers, for example, when parked alongside a road for the purpose of resting as required by various statutes are subject to being held up, and passing vehicles generally pass the parked truck without knowing of the distress condition of the driver. Further, a person's car may break down, and passing vehicles not knowing that an individual needs help will pass without stopping to give aid.

A primary object of the invention is to provide an electrical distress signal device in combination with a vehicle body, in an externally visible position thereon, the device being operatively connected in an electrical circuit actuated by a switch disposed in a position accessible and readily available to an occupant of the vehicle and to be actuated in distress conditions.

A further object of the invention is to provide a device of the character indicated which is disposed substantially flush with the vehicle body in a substantially theft-proof manner, the presence of the device acting as a deterrent to would-be kidnapers, robbers and the like.

Another object of the invention is to provide a distress signal device of this kind which is readily and economically manufactured and installed, easily used, and highly satisfactory and practical for the purpose intended.

These together with other objects and advantages which will become apparent herein reside in the details of construction and operation as more fully hereinafter described and claimed, reference being had to the accompanying drawing forming a part hereof, wherein like numerals refer to like parts throughout, and in which:

Figure 1:
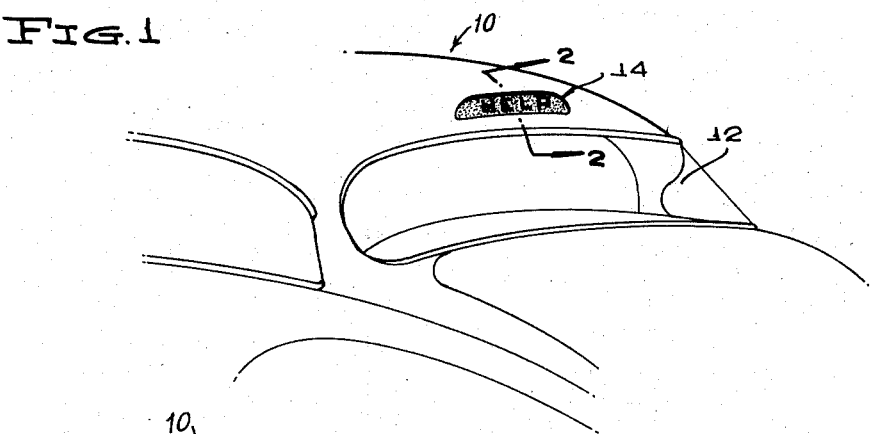
Figure 1 is a fragmentary perspective view of a rear portion of a vehicle body with a distress signal device in accordance with the present invention, installed thereon.
Figure 2:
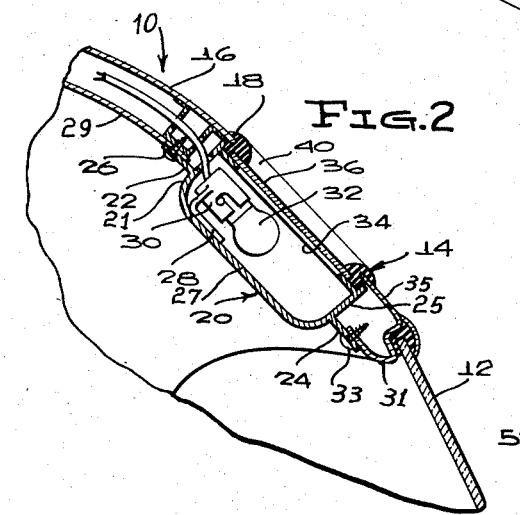
Figure 2 is an enlarged fragmentary vertical sectional view taken substantially on line 2—2 of Figure 1.

Referring to the drawing in detail, the numeral 10 generally designates the rear part of the roof of an automobile having therein a rear window 12 over which is installed a distress signal device 14 in accordance with the present invention. Although the device 14 is shown as being installed above the rear window 12, the same may be located at any other convenient location on the vehicle body, for example, immediately above the front windshield.

The vehicle roof 10 has a top panel 16 formed with a transversely elongated opening 18 in which the signal device 14 is conformably seated and secured. The signal device 14 comprises an elongated open-top shallow pan-shaped casing 20 having a top wall 21 which is curved at its ends, as indicated at 23, to provide end walls which join the ends of a straight lower side wall 25. The casing 20 has a substantially flat bottom wall 27 which merges curvedly into the lower edges of the side and end walls of the casing. The casing 20 is smaller in area than the roof opening 18 and has extending around its walls, in downwardly spaced relation to the upper edges thereof, a lateral mounting flange which comprises upper and lower flanges 22 and 24, respectively. The upper flange portion 22 is preferably secured by a metal screw 26 to the underside of the structural member 29 of the roof 10, spaced beneath the roof panel 16 at the upper side of the roof opening 18. A bracket 31 secured on the lower edge of the opening 18 and projecting upwardly thereinto, has the lower casing portion 24 secured to its underside by such as a metal screw 33. A plate 35 bridges the space between the lower edge of the opening 18 and the upper edge of the lower casing wall 25.

A bracket 28 secured to the casing bottom wall 27 near the upper wall 21, includes a bulb socket 30 in which a lamp bulb 32 is engaged.

An inwardly projecting flange 34 extending around the interior of the casing 20 near the upper edges of the casing walls, provides a seat for a lens of glass or any other suitable material indicated at 36 being of a readily discernible color, blue for example, which will be readily noticed by persons passing the vehicle. The glass or lens 36 may have suitable sign indicia 38 thereon for apprising a bypasser of a distress condition of an individual located within the vehicle. Extending around and overlying the edges of the lens 36 and the upper edges of the walls of the casing 20, in sealing engagement therewith is a suitable molding 40 of rubber or any other suitable material, which is suitably secured to the edges of the opening 18 in the vehicle body roof panel 16.

Figure 4:
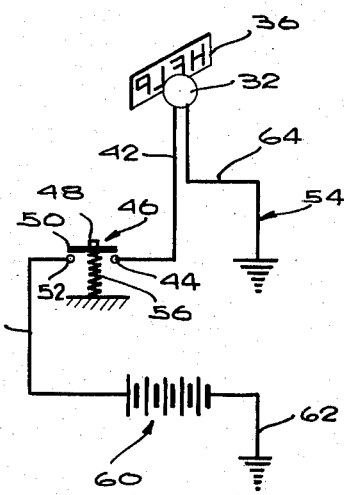
Figure 4 is a wiring diagram of the electrical circuit of the device.
Figure 3:
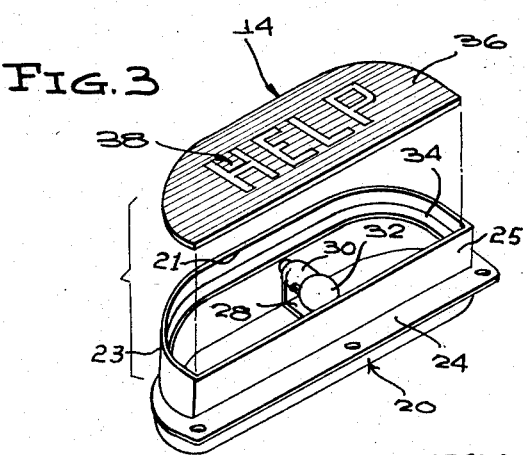
Figure 3 is an exploded perspective view of the signal device per se.

As seen in Figure 4, the light bulb socket is connected by a suitable electrical conductor 42 to one contact point 44 of a switch, indicated generally at 46. The switch 46 is to be located in a position readily accessible to occupants of the vehicle, and includes a manual actuator 48 including a suitable conductive portion 50 engageable with the contact point 44 and a second contact point 52 for closing the electric circuit indicated generally at 54 for energizing the bulb 32. The actuator 48 is urged to an "off" position by means of a suitable compression spring 56. The contact point 52 is connected by a suitable electrical conductor 58 to one side of a battery 60, whose other side is suitably grounded, as by means of an electrical conductor 62 to the vehicle chassis, as is common in single-line electrical systems found in most automotive vehicles. To complete the circuit through the bulb socket 30 for the light bulb 32, said socket is grounded to the vehicle as indicated at 64.

The foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, as fall within the scope of the appended claims.

What is claimed is:

1. In combination, an automobile body having a roof including an outer panel, and a structural member spaced below said outer panel, said outer panel having therein an opening at one side of said structural member, a pan-shaped open-top casing smaller in area than and positioned in said opening, said casing having side walls and end walls, one of said side walls being located adjacent to said structural member and a side of the opening and the other side wall being spaced from the side of the opening remote from said structural member, a first lateral flange on said one side wall secured to said structural member, a second lateral flange on said other side wall, a bracket secured to said second flange and to said outer panel at said remote side of the opening and bridging the space between the casing and said remote side of the opening, a glass closing the open top of the casing, and electric lamp means within the casing.

2. In combination, an automobile body having a roof including an outer panel, and a structural member spaced below said outer panel, said outer panel having therein an opening at one side of said structural member, a pan-shaped open-top casing smaller in area than and positioned in said opening, said casing having side walls and end walls, one of said side walls being located adjacent to said structural member and a side of the opening and the other side wall being spaced from the side of the opening remote from said structural member, a first lateral flange on said one side wall secured to said structural member, a second lateral flange on said other side wall, a bracket secured to said second flange and to said outer panel at said remote side of the opening and bridging the space between the casing and said remote side of the opening, a glass closing the open top of the casing, and electric lamp means within the casing, said second flange being spaced below said outer panel, and a plate extending between and secured to the top of the casing and the outer panel and bridging the space between the casing and the said remote side of the opening, said plate being on a level with the outer panel.

3. In combination, an automobile body having a roof including an outer panel and a structural member spacedly underlying the outer panel, said outer panel having a plain opening therein adjacent to said structural member, said opening having opposed first and second edges, said first edge being adjacent to the structural member, a pan-shaped open-top casing smaller in width than the distance between said first and second edges of the opening, said casing having opposed first and second side walls, said casing being positioned in said opening with its first side wall adjacent to said first edge and bearing against the outer panel, and with its second side wall spaced from said second edge of the opening, a first lateral flange on said first side wall secured to said structural member, a second lateral flange on said second side wall, a bracket secured to said second flange and bridging the space between said second side wall and said second edge of the outer panel opening, means securing said bracket to the second edge of the opening, a glass closing the open top of the casing, and electric lamp means within the casing.

4. The combination of claim 3, wherein retaining means for the glass overlies the glass and extends along and is securably engaged with said first edge of the opening in the outer panel and is securably engaged with said bracket.

References Cited in the file of this patent

UNITED STATES PATENTS

| | | |
|---|---|---|
| 1,232,037 | Jaminet | July 3, 1917 |
| 2,025,952 | Levet | Dec. 31, 1935 |
| 2,252,161 | Borba | Aug. 12, 1941 |
| 2,596,879 | Warren et al. | May 13, 1952 |
| 2,597,556 | Neal | May 20, 1952 |
| 2,803,810 | Evans et al. | Aug. 20, 1957 |

FOREIGN PATENTS

| | | |
|---|---|---|
| 397,963 | France | Mar. 11, 1909 |

OTHER REFERENCES

Popular Mechanics, November 1933, page 713.